(12) United States Patent
Weick et al.

(10) Patent No.: US 7,390,033 B2
(45) Date of Patent: Jun. 24, 2008

(54) SCREW CONNECTION DEVICE FOR CONNECTING THE FLARED ENDS OF TWO PIPES

(75) Inventors: Georg Weick, Plankstadt (DE); Andreas Sausner, Frankfurt (DE); Delbert L. Adkins, Clinton Township, MI (US)

(73) Assignee: Ti Automotive (Heidelberg) GmbH, Heidelberg (DE)

( * ) Notice: Subject to any disclaimer, the term of this patent is extended or adjusted under 35 U.S.C. 154(b) by 0 days.

(21) Appl. No.: 10/973,560

(22) Filed: Oct. 25, 2004

(65) Prior Publication Data

US 2005/0087984 A1   Apr. 28, 2005

(30) Foreign Application Priority Data

Oct. 27, 2003  (EP)  ................................... 03024646
Oct. 14, 2004  (EP)  ................................... 04024492

(51) Int. Cl.
    *F16L 25/00*  (2006.01)
(52) U.S. Cl. .................... 285/334.2; 285/334.2; 285/354
(58) Field of Classification Search ... 285/334.1–334.5, 285/332.2, 917, 353, 354, 385, 384
See application file for complete search history.

(56) References Cited

U.S. PATENT DOCUMENTS

| 431,816 | A | * | 7/1890 | Lomasney | .................. | 285/331 |
| 2,189,556 | A | * | 2/1940 | Kreidel | ..................... | 285/332.4 |
| 2,189,566 | A | * | 2/1940 | Kreidel | ..................... | 285/332.4 |
| 4,133,565 | A | * | 1/1979 | Shutt | ....................... | 285/334.5 |
| 4,842,310 | A | * | 6/1989 | Muffke et al. | ............ | 285/334.5 |
| 6,357,801 | B1 | * | 3/2002 | Takahashi et al. | ........ | 285/334.5 |

FOREIGN PATENT DOCUMENTS

| DE | 2407268 A | 8/1975 |
| DE | 4425827 A | 12/1995 |
| DE | 20002170 U1 | 6/2001 |
| EP | 1236946 A | 9/2002 |
| JP | 07248079 A | 9/1995 |

* cited by examiner

*Primary Examiner*—Aaron M Dunwoody
(74) *Attorney, Agent, or Firm*—Leydig, Voit & Mayer, Ltd.

(57) ABSTRACT

A screw connection device for connecting the flared ends of two pipes includes a nut, a screw and distance element which comprises a first recess or shape for accommodation of the flare at the end of a first pipe, and a second recess or shape for accommodation of the flare at the end of the other pipe. The nut and screw each accommodate one pipe end with the distance element between them with the recess at each end in sealing contact with the pipe flares. The nut and/or the pipe flare of the pipe end which in the connected state is accommodated in the nut comprise positive-fit elements, which positive-fit elements are designed such that the accommodated pipe end is secured against rotation relative to the nut.

14 Claims, 6 Drawing Sheets

Fig. 1

PRIOR ART

SCREW CONNECTION DEVICE FOR CONNECTING THE FLARED ENDS OF TWO PIPES

BACKGROUND OF THE INVENTION

This application claims priority pursuant to Title 35 U.S.C. § 119 to EP Application No. 03024646.6 filed Oct. 27, 2003 and EP Application No. 04024492.3 filed Oct. 14, 2004.

The invention relates to a screw connection device for connecting the flared ends of two pipes. The term "screw connection device" or "connector" comprises the device elements which are required for connecting the ends of the two pipes. The invention relates in particular to a screw connection of pipes which are used in the field of hydraulics, or which are used as brake lines in motor vehicles.

From practical application, a screw connection of two pipes is known in which the end of one pipe comprises a so-called E-flare while the end of the other pipe comprises an F-flare which is complementary to said E-flare. Both E-flares and F-flares are for example defined in DIN 74234. In the known screw connection, both pipe flares are pushed against teach other with very considerable contact pressure force by means of a screw connection device using a nut and an associated screw. The aim is to achieve a tight connection, or a connection which is tight even at high pressure, of the pipe ends. However, this screw connection known from the state of the art has some undesirable disadvantages. When forming the E-flare to one of the pipe ends, this pipe end, at least in certain regions, is plastically deformed to a relatively extensive degree. Because of solidification as a result of cold forming, a negative influence results in relation to the longevity of the formed connection. Such negative influence comes to bear in particular in the case of mechanical loads on the screw connection, for example as a result of exposure to vibration. Furthermore, when the screw connection is being established, at the end of the screwing process, one or both of the pipe ends rotates/rotate as well. Frequently, undesirable rotation of a pipe end relative to the screw connection device also occurs. Since the pipes are usually fixed at their ends which are opposite the screw connection, pipe torsion occurs in such an arrangement. Such pipe torsion exerts torque on the screw connection, with said torque supporting a loosening of the screw connection. For this reason, in practical application the screw connection or the screw arrangement is tightened beyond its limit. If, at the time of establishment of the screw connection, the pipes are rotated in relation to each other, damage to the sealing surfaces can occur as a result of mutual friction between the two pipe flares. It is understood that this is disadvantageous. In summary, the known screw connection can be improved.

In contrast to the above, it is the object of the invention to provide a screw connection or a screw connection device of the type mentioned in the introduction with which connection or connection device, in a simple way, a connection of the two pipe ends can be released which is tight, or tight at high pressure, in the long term, and which avoids the disadvantages explained above, and with which connection or connection device in particular undesirable rotation of the pipe ends can be prevented or minimized during production of the screw connection.

This object is met by a screw connection device according to the invention for connecting the flared ends of two pipes, wherein a distance element is provided which at a first end comprises a first positive-fit recess for positive-fit accommodation of the flare at the end of a (first) pipe, and at a second end comprises a second positive-fit recess for positive-fit accommodation of the flare at the end of the other (second) pipe, wherein furthermore a nut is provided for accommodating the one pipe end, in which nut the distance element in the connected state has been inserted such that the flare of the pipe end accommodated by the nut grips the associated positive-fit recess of the distance element and wherein furthermore a screw for accommodating the other pipe end is provided, with the accommodated pipe end of said screw in the connected state being screwed into the nut such that the flare of the pipe end accommodated by the screw grips the associated positive-fit recess of the distance element, and wherein the nut and/or the pipe flare of the pipe end which in the connected state is accommodated in the nut comprise positive-fit elements, which positive-fit elements are designed such that the accommodated pipe end is secured against rotation relative to the nut.

The term "in the connected state" refers to the state when the screw connection between the two flared pipe ends has been established. The invention relates to a screw connection device comprising a nut, a screw and a distance element, or the invention relates to a screw connection device which essentially comprises the nut, the screw and the distance element. However, the invention also covers the screw connection unit which comprises the nut, the screw, the distance element and the two pipe ends which are to be connected.

According to a first preferred embodiment of the invention, the nut comprises positive-fit elements on the inside, while the pipe flare of the pipe end which in the connected state is accommodated in the nut comprises complementary positive-fit elements, while in the connected state the interior positive-fit elements of the nut engage the complementary positive-fit elements on the pipe flare. In this way, the accommodated pipe end is effectively secured against rotation relative to the nut. According to one embodiment, the positive-fit elements are notches provided in the nut, which notches are preferably aligned radially. In this arrangement, the complementary positive-fit elements on the pipe flare are then expediently designed as corresponding projections which can engage the notches on the nut so as to provide positive fit. According to another embodiment, the complementary positive-fit elements of the pipe flare can also be designed as notches, in which case the positive-fit elements on the nut are preferably in the form of projections or webs which can engage the notches on the pipe flare so as to provide positive fit. According to the invention, the depth of the notches or the height of the projections or webs is selected such that when there is positive fit the accommodated pipe end is secured against rotation relative to the nut.

According to another preferred embodiment of the invention, only the nut comprises interior positive-fit elements, which positive-fit elements are designed such that when they establish the screw connection they cut into the pipe flare of the pipe end which in the connected state is accommodated in the nut, so that complementary positive-fit elements form in the pipe flare. In this embodiment the pipe flare does not have any complementary positive-fit elements to start with, but instead, these complementary positive-fit elements are only formed by the corresponding pressing action, at the time the screw connection is made, due to the action of the positive-fit elements onto the pipe flare. Expediently, the positive-fit elements on the nuts are projections or webs which can cut into the pipe flare. It is within the scope of the invention for the material for the pipe flare to be selected accordingly, so that such cutting into the pipe flare and the formation of complementary positive-fit elements is easily possible.

It is within the scope of the invention for the distance element to be a sealing distance element. In other words, each positive-fit recess of the distance element comprises a sealing surface or sealing surfaces which comes/come to rest against a complementary sealing surface of the associated pipe flare. Furthermore, it is within the scope of the invention for the nut to comprise an internal thread and for the screw to comprise a complementary external thread with which it engages the internal thread of said nut in the connected state. The nut accommodates a first pipe end. It is the pipe end which, when the screw has not yet been inserted in the nut, is already accommodated in the nut. When the screw with the accommodated second pipe end has been inserted in the nut, the nut also encompasses the second pipe end accommodated in the screw.

According to a particularly preferred embodiment which assumes particular importance within the scope of the invention, at least one positive-fit recess, and particularly preferred both positive-fit recesses of the distance element is/are designed for positive-fit accommodation of a flare at the associated pipe end, with said flare comprising a cone-shaped flange face on the outside of the pipe, wherein the associated cone tapers off towards the face end of the pipe end. The positive-fit recess of the distance element comprises a corresponding complementary cone-shaped complementary flange face on the inside. It is within the scope of the invention for at least one positive-fit recess, particularly preferably for both positive-fit recesses of the distance element to be designed for positive-fit accommodation of an F-flare at the associated pipe end. At both ends, the distance element thus comprises at least one, preferably two, positive-fit recesses which is/are complementary to an F-flare.

It is thus within the scope of the invention for both pipe ends which are to be connected to comprise an F-flare. In the connected state, the F-flare of the first pipe end is thus adjoined by the first positive-fit recess of the distance element, while at the opposite end of the distance element, the F-flare of the second pipe end grips the second positive-fit recess of the distance element. According to a preferred embodiment, the connection F-flare/distance element/F flare takes place without the incorporation of any further elements. It is also within the scope of the invention that the distance element faces be complimentary to SAE flares. Also, one face of the distance element could be complimentary to an F-flare and the other could be complementary to an E-flare.

According to one embodiment of the invention, in the connected state, the distance element is inserted in an accommodation aperture of the nut. In this embodiment, the distance element is not held in the nut by a screw connection, but instead is only inserted with positive fit into the accommodation aperture of the nut. Expediently, in this arrangement the distance element is held by at least one knob provided on the surface or interior surface of the accommodation aperture. Preferably, the distance element is inserted into the accommodation aperture by way of the knob, literally clicking into place behind the knob. According to a preferred embodiment, several such knobs are distributed on the interior circumference of the accommodation aperture. It is within the scope of the invention for the accommodation aperture of the nut to be cylindrical in shape.

According to another preferred embodiment of the invention, the accommodation aperture of the nut comprises an internal thread and the distance element comprises an external thread which is complementary to the internal thread. According to this embodiment, in the connected state the distance element is screwed into the accommodation aperture of the nut. The distance element is thus fixed in the accommodation aperture of the nut by means of a screw connection.

It is within the scope of the invention for the accommodation aperture of the nut to be provided both for accommodation of the distance element and for accommodation of the screw. The screw is screwed in with its external thread engaging the internal thread of the accommodation aperture.

It is furthermore within the scope of the invention for the nut to comprise an accommodation channel of reduced diameter when compared to the diameter of the accommodation aperture, with said accommodation channel being provided for accommodating the one (first) pipe end. This (first) pipe end thus reaches through the accommodation channel of the nut. Expediently, the screw also comprises an accommodation channel for accommodating the other (second) pipe end.

It is within the scope of the invention for the nut to comprise a stop face which in the connected state grips from the rear the flare of the (first) pipe end and accommodated in the nut. Expediently, the stop face is arranged at the transition between the accommodation channel and the accommodation aperture of the nut. It is furthermore within the scope of the invention for the screw to comprise a face which grips from the rear the pipe flare of the (second) pipe and accommodated in the screw.

As already outlined above, it is within the scope of the invention for the nut to comprise interior positive-fit elements for engagement with complementary positive-fit elements on the pipe flare of the pipe end which is accommodated in the nut, wherein the complementary positive-fit elements can already be present in the pipe flare, or alternatively, can be generated during establishment of the screw connection by cutting positive-fit elements into the nut. Expediently, the positive-fit elements of the nut are provided on the above-mentioned stop face of the nut.

A preferred embodiment of the invention is characterized in that the nut comprises interior positive-fit elements for engaging the complementary positive-fit elements on the pipe flare of the (first) pipe and accommodated in the nut, which positive-fit elements or complementary positive-fit elements are designed such that the accommodated pipe end is secured against rotation relative to the nut. It is within the scope of the invention for these positive-fit elements to be provided on the stop face of the nut. In a preferred embodiment, these positive-fit elements can be teeth or projections which engage corresponding retaining notches on the flare of the accommodated pipe end.

It is within the scope of the invention for the distance element on at least one positive-fit recess, preferably on both positive-fit recesses, to comprise a surface which is designed such that the torque provided by one pipe end is safely transferred. The surface of the positive-fit recess can for example be a profiled surface. In this connection it is within the scope of the invention for the surface of the positive-fit recess to comprise positive-fit elements for engaging the complementary positive-fit elements on the flange face of the flare of the associated pipe end.

As a result of the last-mentioned embodiments according to the invention, any rotation of the pipe ends relative to the distance element or relative to each other can effectively be suppressed.

The invention is based on the recognition that with the screw connection device according to the invention, in a simple and economical way, a connection can be established which is tight, or tight at high pressure, in the long term. In particular, during operation of the screw connection device no disadvantageous impairment of the sealing surfaces takes place. With the screw connection device according to the invention, rotation of the pipes to be connected, relative to each other, during screwing together can be prevented. The invention is in particular based on the essential recognition that is this context it is important that rotation of the pipe accommodated by the nut relative to the nut be prevented. As a result of this, the pipes or the screw connection device can easily be installed, for example in a motor vehicle.

Because rotation of the pipes relative to the distance element is avoided, damage to the sealing surfaces as a result of friction can be prevented. In particular, friction between the pipe flare on the side of the screw and the distance element can be kept relatively high by means of a suitable geometric shape of the distance element. If this friction between the flare on the side of the screw and the distance element exceeds the friction between the screw and the rear of the flare, when the screw connection is established the screw will rotate relative to the pipe accommodated therein. Rotation of the two pipes relative to each other is thus suppressed and any associated undoing moment can thus also be prevented.

Below, the invention is explained in more detail by means of drawings which shows examples of embodiments of the invention.

DETAILED DESCRIPTION OF THE DRAWINGS

Figure 1:
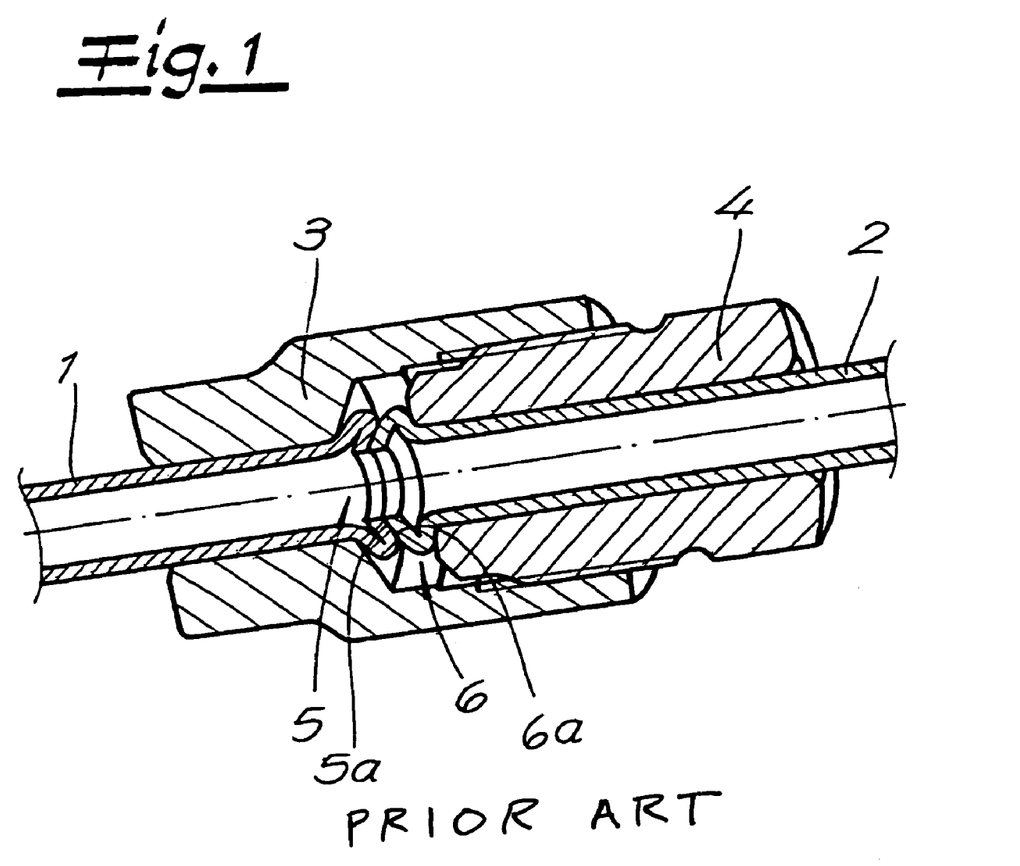
FIG. 1 is a perspective view of a screw connection according to the state of the art.

FIG. 1 shows a screw connection or a screw connection device according to the state of the art. The two pipe ends 1, 2 to be connected are connected to each other by means of a screw connection device having a nut 3 and a screw 4. The two pipe ends 1, 2 are flared. The first pipe end 1 comprises an E-flare 5 while the second pipe end 2 comprises an F-flare 6. As is shown, the E-flare 5 comprises a flange face 5a which is of conical shape, with the respective cone tapering off towards the inside, i.e., towards the side of the pipe. The F-taper 6 also comprises a cone-shaped flange face 6a, however, this cone tapers off toward the outside, i.e. towards the face end of the pipe end 2. The two pipe flares 5, 6 are pressed against each other with very considerable contact pressure force as a result of the nut 3 and the screw 4 being screwed together. In this way a connection is to be established which is tight or tight at high-pressure. However, the screw connection known from the state of the art is associated with the disadvantages that have already been mentioned above.

Figures 2, 2A:
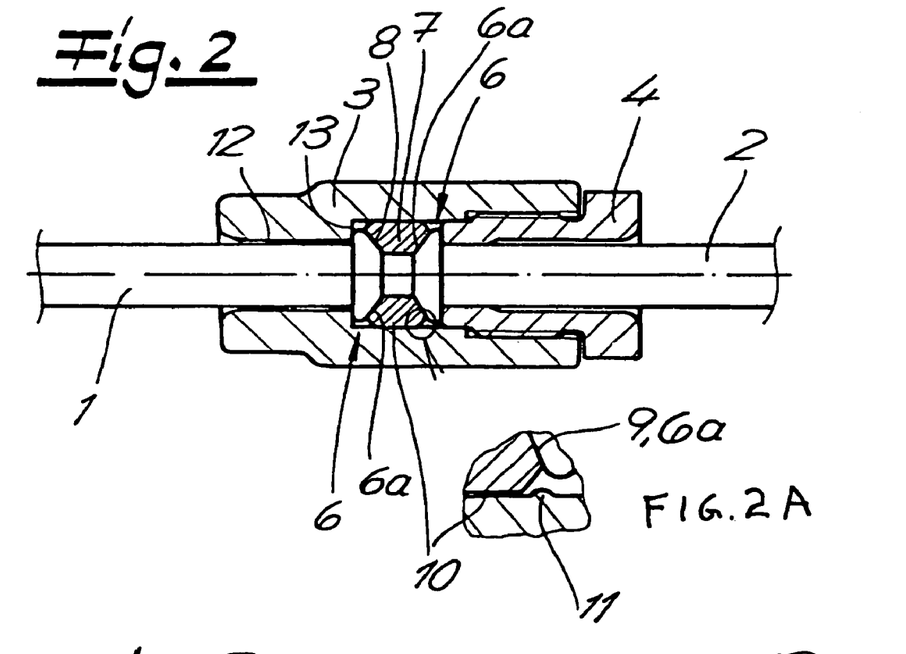
FIG. 2 is a longitudinal section of a screw connection according to the invention.
FIG. 2A is a fragmentary view, on an enlarged scale, of a portion of the apparatus of FIG. 2.
Figure 3:
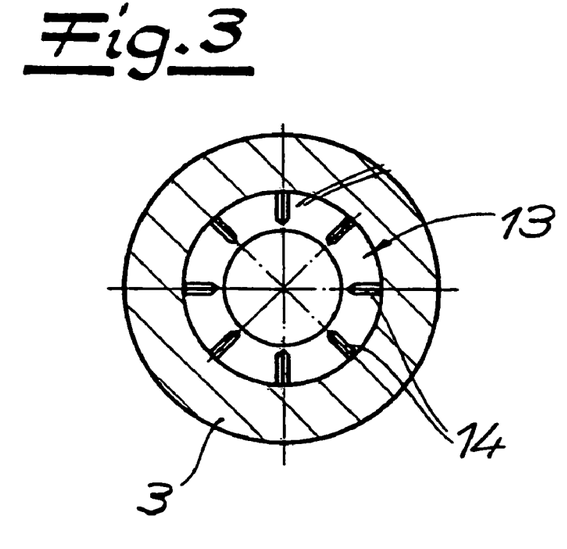
FIG. 3 is a section of the connection device according to FIG. 2.
Figure 4:
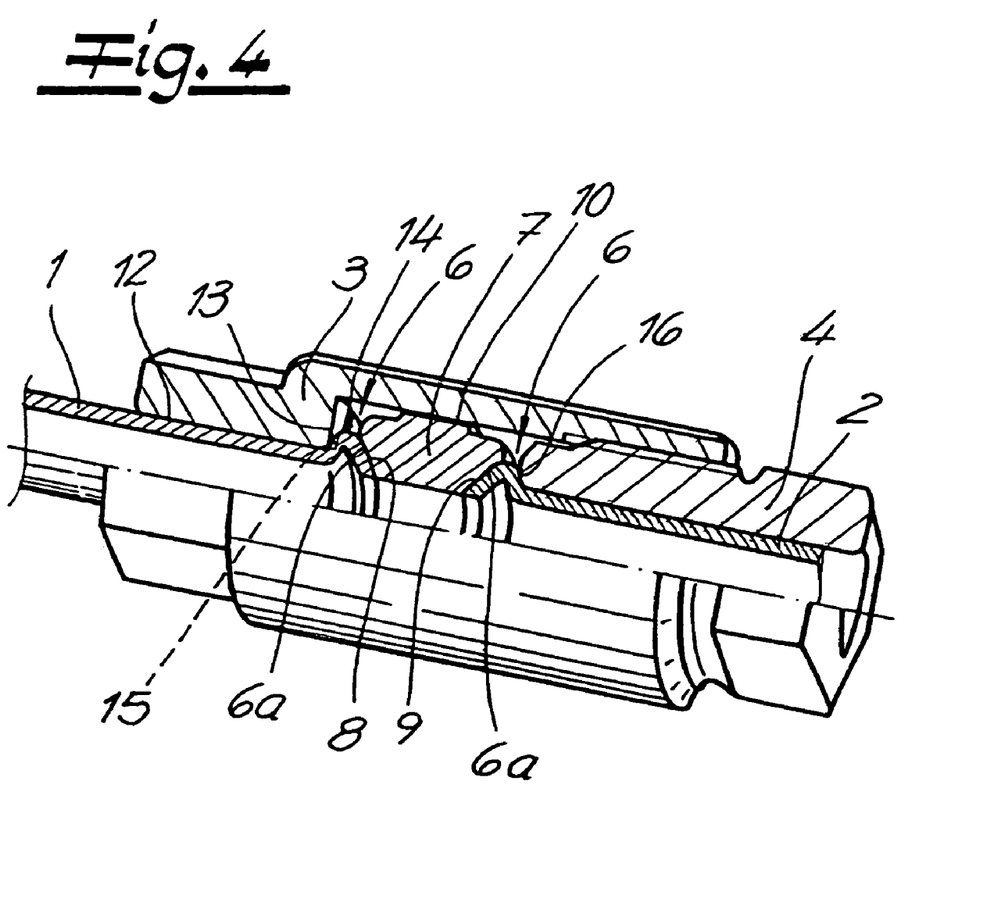
FIG. 4 is a perspective view of the screw connection according to the invention.

FIGS. 2 to 4 show a screw connection or screw connection device, according to the invention, for connecting the flared ends 1, 2 of two co-axial pipes. According to the invention, a distance element or spacer 7 is used which distance element 7 on a first end comprises a first positive-fit recess or complementary shape 8, and on a second end comprises a second positive-fit recess or complementary shape 9. Both the first positive-fit recess 8 and the second positive-fit recess 9 have been provided for positive-fit accommodation of the conical seats of a pipe flare 6 on the associated pipe end 1, 2 with said flare 6 comprising a cone-shaped flange face on the exterior of the pipe, wherein the respective cone tapers off towards the face end of the pipe end 1, 2 to define conical seats. It is within the scope of the invention for both the first positive-fit recess 8 and the second positive-fit recess 9 to have been provided for positive-fit accommodation of an F-flare 6 on each pipe end 1, 2. Such F-flares 6 are provided on the pipe ends 1, 2 in the embodiment according to FIGS. 2 and 4. Any complementary shapes are, of course, within the scope of the invention.

It is understood that the distance element 7 is hollow on the inside so that the liquid fed through the pipes can pass through said distance element 7. The positive-fit recesses 8, 9 and the associated F-flares 6 comprise sealing surfaces which in the connected state are pressed against each other. FIGS. 2 and 4 show that the nut 3 is provided for accommodating the first pipe end 1 and that in the connected state the distance element 7 is inserted into the nut 3 such that the F-flare 6 of the first pipe end 1 accommodated by the nut 3 grips the associated positive-fit recess 8 of the distance element 7 or is pushed into said positive-fit recess. In the embodiment according the FIGS. 2 to 4, the distance element 7 in the connected state is only inserted into the accommodation aperture 10 of the nut 3. In this arrangement, the distance element 7 is held in its position by means of knobs 11, best seen in FIG. 2A, distributed around the interior circumference of the accommodation aperture 10. Element 7 is made of a material sufficiently resilient to permit insertion into the interior circumference of accommodation aperture 10 and to provide a sealing relationship of faces 8 and 9 against the flares 6a on the pipes or tubes 1 and 2. Alternatively, if the distance element 7 is, for example, made of metal, the knobs 11 are formed after insertion of the distance element 7 into the accommodation aperture 10.

Furthermore, the nut 3 comprises an accommodation channel 12 of reduced diameter when compared to the diameter of the accommodation aperture 10. The first pipe end 1 is accommodated in a positive fit in this accommodation channel 12.

The screw 4 has been provided for accommodating the second pipe end 2. In the connected state, this screw 4 with its accommodated second pipe end 2 is screwed into the nut 3 such that the F-flare 6 of the pipe end 2 accommodated by the screw 4 grips or is pushed into the associated positive-fit recess 9 of the distance element 7. FIGS. 2 and 4 show that the accommodation aperture 10 of the nut 3 has been provided both for accommodating the distance element 7 and for accommodating the screw 4 with the accommodated second pipe end 2.

Figure 3A:
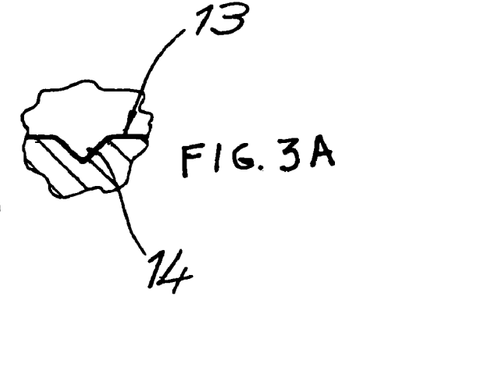
FIG. 3A is a fragmentary view, on an enlarged scale, of a portion of the apparatus of FIG. 3.
Figure 5:
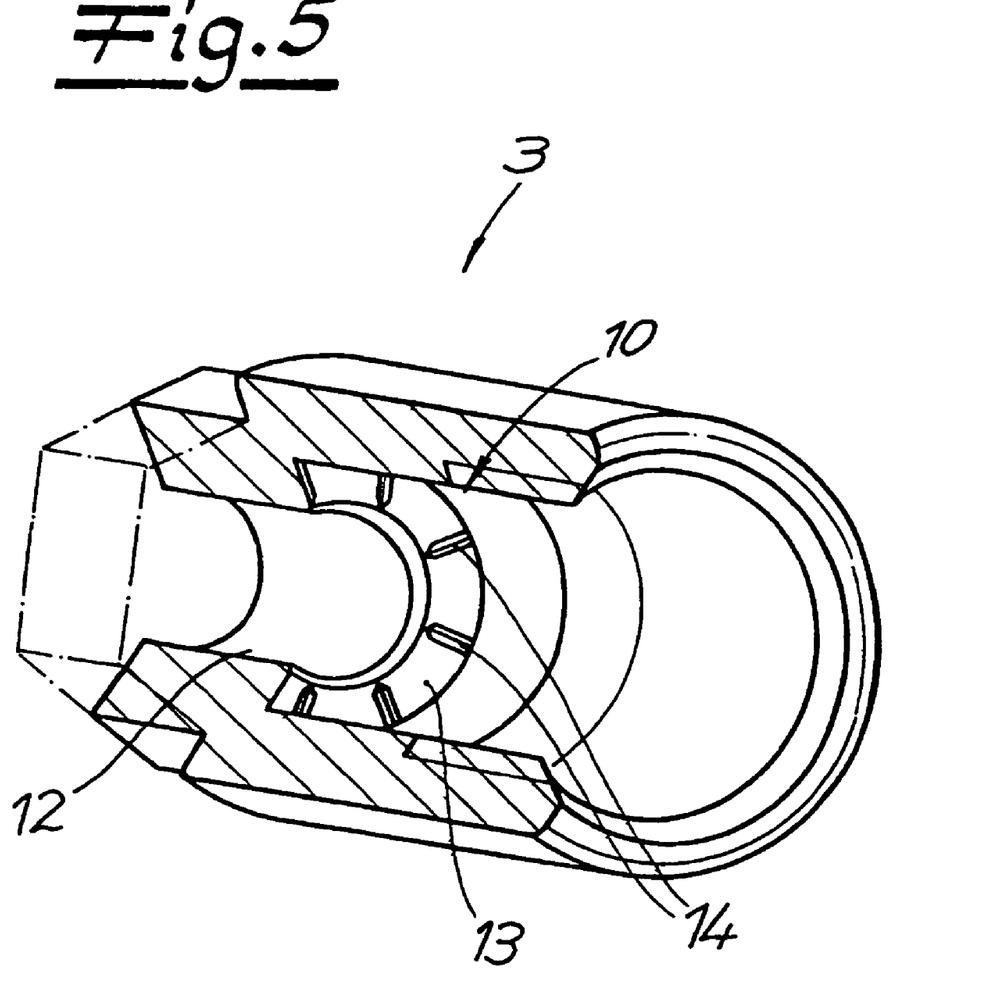
FIG. 5 is a perspective view of the nut of the inventive connection device.

FIGS. 3, 3A and 5 show that at the transition between the accommodation channel 12 and the accommodation aperture 10, the nut 3 comprises a stop face 13. The stop face 13 grips from the rear the F-flare 6 of the first pipe end 1 accommodated in the accommodation channel 12 of the nut 3. In the region of the stop face 13, the nut 3 comprises positive-fit elements, arranged on the inside, in the form of projections 14 which engage complementary positive-fit elements in the form of retaining notches 15 on the F-flare of the first pipe end 1. The positive-fit elements and the complementary positive-fit elements are designed such that the first pipe end 1 accommodated in the nut is secured against rotation relative to the nut 3. Furthermore, the screw 4 comprises a face 16 which grips from the rear the F-flare 6 of the second pipe end 2 accommodated in the screw 4.

In another embodiment, the projections 14 could be formed in the face 16 of the screw rather than in the stop face 13. The notches 15 would then be on the rear or cone-shaped flange face on the exterior of the second pipe end 2.

Figure 6:
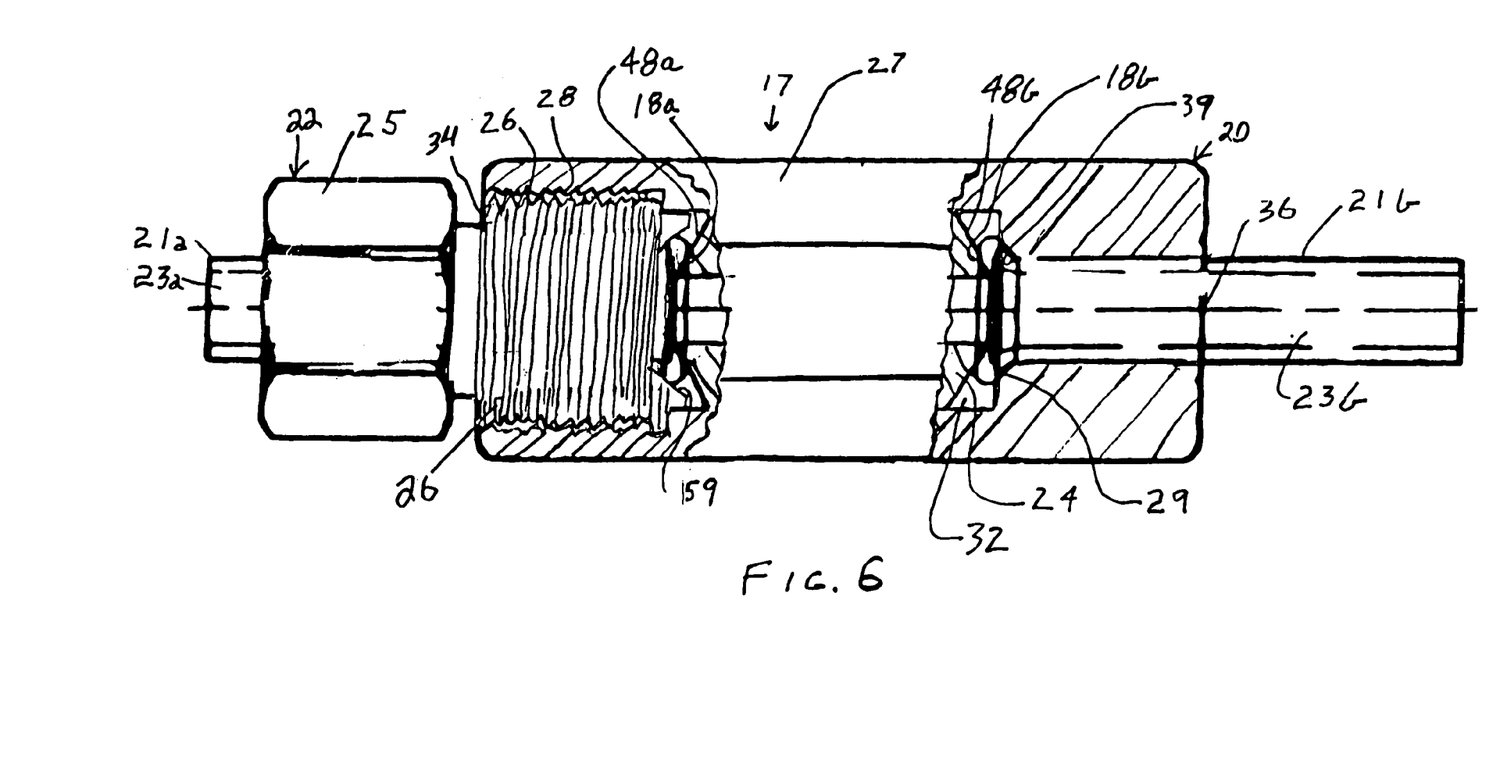
FIG. 6 is a plan view, partially in section, showing a tube-to-tube connection in accordance with the present invention.
Figure 7:
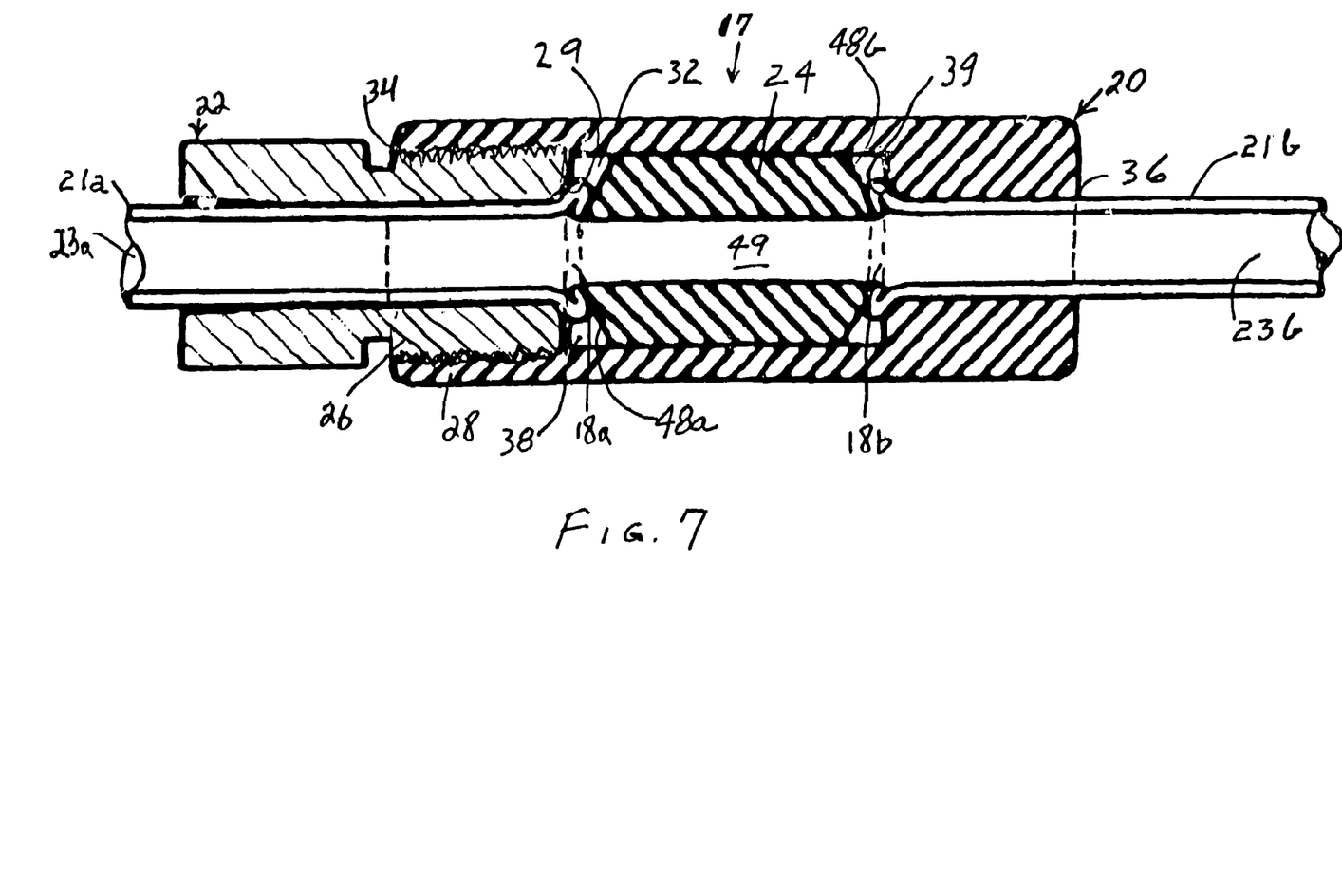
FIG. 7 is a cross-sectional plan view showing the tube-to-tube connection of FIG. 6.

Another embodiment is illustrated in FIGS. 6 and 7. The connection device connects two pipes or tubes having SAE flares at their respective ends.

The connector 17 connects coaxial hollow fluid-conducting tubes or pipes 21a and 21b which define passages 23a and 23b, respectively. Tubes 21a and 21b have facing spaced ends formed with SAE flares. The flared ends form conical seats 18a and 18b. The rear surface of flare 18a is outer flared surface 29 of tube 21b.

Connector 17 is a two-piece structure having a female body or nut 20 and a male attachment member or screw 22. An internal spacer or distance element 24 is disposed within the female body. The male attachment member 22 and the female body 20 are disposed in surrounding relation to the tubes 21a and 21b at the facing tube ends. The male attachment member 22 and the female body 20 are joined together in threaded fashion in such a way as to secure the tube ends together in fluid-tight relation.

Male attachment member 22 has an annular body, with an inner bore having a diameter slightly larger than the diameter of the tube 21a. It defines hexagonal flats 25 to assist in making the threaded connection. Male attachment member 22 has a threaded end 26 to allow for attachment to the female body 20. It includes an annular conical seat 29 that is complementary to, and supports the rear face of the flare of the tube 21a.

Female body 20 is generally annular with hexagonal flats 27 to assist in making the threaded connection. It defines an internal bore 32 having two open ends 34 and 36. Adjacent end 36 of female body 20, the bore is sized to receive and retain tube 21b. Adjacent end 34 of female body 20, the bore 32 is relatively large and provided with threads 28 to receive and retain the threaded end 26 of male attachment member 22.

The bore 32 of female body 20 defines a central cavity 38 to receive the internal spacer 24. The end of cavity 38 adjacent the portion of the bore 32 that receives tube 21b is formed with a conical seat 39 that is complementary to, and supports the rear face of the flare of tube 21b.

Disposed within central cavity 38 of female body 20 is internal spacer 24 or distance element, such as element 7 of the embodiment of FIGS. 2-5. The internal spacer 24 is sized relative to the bore of the central cavity 38 so as to prevent radial movement in the cavity 38. It is annular, and has a bore 49 to allow the flow-through of fluids between tubes 21a and 21b. The internal spacer 24 is positioned between conical seats 18a and 18b of the flared ends of tubes 21a and 21b. It includes opposite conical ends 48a and 48b that define complimentary faces that mate with and seal against the conical seats 18a and 18b of tube ends 21a and 21b. After the male member 22 is secured to female member 30, the spacer is compressed between the tube ends and forms a fluid-tight junction of conical seats 18a and 18b and faces 48a and 48b.

Conical seat 39 within internal bore 32 seats against the outer flared surface of tube 21b. The conical seat 39 within bore 32 and outer flared surface of tube 21b are shaped with complementary projections and notches such that tube 21b cannot rotate relative to body 20. The projections and notches are shaped as best illustrated in FIG. 3 or 3A which shows projections 14. The outer flared surface of tube 21b includes notches to receive the projections. Notably, complementary surface 29 that is associated with the outer flared surface of tube 21a is conical, but does not include projections or notches. Thus, rotation of female body or nut 20 relative to tube 21b is prevented, but male attachment member or screw 22 can rotate freely relative to tube 21a during the assembly process.

To assemble the tube connection, the connector components 20 and 22 are each first associated with one tube 21a or 21b and the flares on the tube ends then formed. These components are thus attached to, but slidable on, the respective tubes. The tubes 21a and 21b are connected by threading the male attachment member 22 into female body part 20. The internal spacer 24 is first positioned between conical seats 18a and 18b of SAE flare ends of tubes 21a and 21b. As the threaded connection is completed the complementary faces ends 48a and 48b seat, in fluid-tight relation to the tube conical seats 18a and 18b. The internal spacer 24 and tubes 21a and 21b form a fluid-tight junction, which allows the flow-through of liquids between tubes 21a and 21b.

Of course, it is contemplated that the invention is applicable to connection of pipes having any form of flare including ISO flares or E-F-flares. It is only necessary to shape the connector 10 and the internal spacer 24 to mate with the flare formed on the pipes to be joined.

Whereas the present invention is described herein with respect to specific embodiments thereof, it will be understood that various changes and modifications may be made by one skilled in the art without departing from the scope of the invention, it is intended that the invention encompass such changes and modifications as fall within the scope of the appended claims.

We claim:

1. A pipe connection assembly connecting the flared ends of two pipes comprising:

first and second pipes having flared ends defining a cone-shaped flange face on an exterior of each said pipe, each having a rear surface, a spacer which at a first end comprises a first complimentary shape for accommodation of the flange face of said flare at the end of one of said pipes, and at a second end comprises a second complimentary shape for accommodation of the flange face of said flare at the end of the other of said pipes;

a nut including an accommodation channel accommodating one pipe and an accommodation aperture;

said spacer disposed within said accommodation aperture of said nut with said first complimentary shape thereof in contact with said flange face of the flare of said pipe accommodated by said nut and a screw having an accommodation channel accommodating the other of said pipes, said pipe accommodated by said screw secured to said nut by said screw, with said second complementary shape of said spacer in contact with said flange face of the flare of said pipe accommodated by said screw and said nut defining a stop face extending between said accommodation channel and said accommodation aperture, said stop face including a plurality of projections extending radially and spaced apart circumferentially about said stop face, and engaging said rear surface of said cone shaped flange of said flare of said pipe accommodated by said nut.

2. A pipe connection assembly according to claim 1 wherein both said complimentary shapes on said spacer are shaped to accommodate a cone-shaped flange face on the outside of the pipe that tapers off towards the face of the pipe end.

3. The connection assembly according to claim 1 wherein, said spacer is hollow and defines a passage between the pipe ends.

4. The connection assembly according to claim 3, wherein the accommodation aperture of the nut includes knobs to retain said spacer therein.

5. The connection assembly according to claim 1, wherein the rear surface of said flare of the pipe end accommodated in the nut includes at least one notch engaged by at least one radial projection on said stop face of said nut.

6. The connection assembly according to claim 5, wherein said rear surface of said flare includes a plurality of radial notches engaged by said projections such that said accommodated pipe end is secured against rotation relative to the nut.

7. A connection device connecting the flared ends of two pipes comprising:
   first and second pipes having flared ends defining a cone shaped flange face on an exterior of each said pipe, each having a rear surface,
   a distance element which at a first end comprises a first positive-fit recess for positive-fit accommodation of the flare at the end of one of said pipes, and at a second end comprises a second positive-fit recess for positive-fit accommodation of the flare at the end of the other of said pipes;
   a nut including an accommodation channel accommodating one pipe and further including an accommodation aperture
   said distance element disposed within said accommodation aperture of said nut with said first positive-fit recess in contact with the flare of said pipe accommodated by said nut;
   a screw having an accommodation channel accommodating the other of said pipes said pipe accommodated by said screw secured to said nut by said screw, with said second positive-fit recess of said distance element in contact with the flare of said pipe accommodated by said screw;
   wherein one of said nut and said screw comprise a positive-fit element, which positive-fit element is designed such that the pipe accommodated by said one of said nut and said crew comprising said positive-fit element is secured against rotation relative to said positive-fit element, and said positive fit element on said one of said nut and said screw defines a stop face engaging the rear surface of the flare of said one of said pipes accommodated by said one of said nut and screw and said positive fit element comprises at least one radial projection formed thereon engaging the rear surface of said flare of said pipe accommodated by said one of said nut and said screw to secure said pipe from rotation relative to said nut or said screw.

8. The connection device according to claim 7, wherein said nut includes said stop face and has a plurality of radial projections spaced circumferentially on said stop face and the rear surface of the pipe flare of the pipe end which is accommodated in the accommodation channel of said nut includes a plurality of radial notches engaged with said projections, and wherein the projections on said stop face engage said notches on the rear surface of the flare of the pipe.

9. A connection according to claim 7 wherein said positive-fit recesses on said distance element are shaped to accommodate a cone-shaped flange face on an outside of each said pipe that tapers off towards the face of the pipe end.

10. The connection device according to claim 7, wherein said distance element is hollow and defines a passage for communication between the pipes ends.

11. The connection device according to claim 10, wherein the accommodation aperture of the nut includes knobs to retain said distance element therein.

12. The connection device according to claim 10, wherein said stop face is a transition surface between said accommodation channel and said accommodation aperture of said nut.

13. A method of connecting the flared ends of two pipes, the steps comprising;
   providing first and second pipes having flared ends defining cone-shaped flange faces on an exterior of each said pipe each having a rear surface;
   providing a distance element which at a first end comprises a first positive-fit surface for positive-fit accommodation of the flare at the end of a first pipe, and at a second end comprises a second positive-fit surface for positive-fit accommodation of the flare at the end of the other of said pipes;
   providing a nut including an accommodation channel accommodating one of said pipes and an accommodation aperture for accommodating said distance element, and a stop face having a plurality of projections extending radially and spaced apart circumferentially about said stop face extending between said accommodation channel and said accommodation aperture;
   inserting said first pipe into said accommodation channel of said nut
   inserting said distance element in said nut with said first positive-fit surface thereof in contact with the flare of the pipe accommodated by the nut;
   providing a screw including an accommodation channel accommodating the other of said pipes;
   connecting said screw to said nut and engaging said radially extending projections on said stop face with said rear surface of said flared end of said pipe accommodated by said nut.

14. A method of providing a connection as claimed in claim 13, the steps further comprising:
   forming said rear surface of said flare of the pipe accommodated in said nut to conform with said radial projections on said stop face by screwing said screw into said nut to force said projections on said stop face into the rear surface of the flare of said pipe.

* * * * *